(12) United States Patent
Lemley, III et al.

(10) Patent No.: US 7,818,800 B1
(45) Date of Patent: Oct. 19, 2010

(54) METHOD, SYSTEM, AND COMPUTER PROGRAM PRODUCT FOR BLOCKING MALICIOUS PROGRAM BEHAVIORS

(75) Inventors: David Glenn Lemley, III, Cedar Park, TX (US); Bret Michael Needle, Austin, TX (US); Mark Eric Obrecht, Austin, TX (US)

(73) Assignee: Symantec Corporation, Mountain View, CA (US)

( * ) Notice: Subject to any disclaimer, the term of this patent is extended or adjusted under 35 U.S.C. 154(b) by 1110 days.

(21) Appl. No.: 11/499,283

(22) Filed: Aug. 4, 2006

Related U.S. Application Data

(60) Provisional application No. 60/705,892, filed on Aug. 5, 2005.

(51) Int. Cl.
*G06F 12/14* (2006.01)
(52) U.S. Cl. .......................................... 726/22; 726/23
(58) Field of Classification Search ............... 726/22–23
See application file for complete search history.

(56) References Cited

U.S. PATENT DOCUMENTS

| | | | |
|---|---|---|---|
| 7,627,758 B1* | 12/2009 | Tock et al. .................. | 713/168 |
| 2002/0040339 A1* | 4/2002 | Dhar et al. ..................... | 705/38 |
| 2003/0048766 A1* | 3/2003 | D'Annunzio et al. ........ | 370/338 |
| 2005/0198532 A1* | 9/2005 | Comlekoglu et al. ........ | 713/201 |
| 2006/0206937 A1* | 9/2006 | Repasi et al. .................. | 726/22 |

OTHER PUBLICATIONS

Neil Chou, Robert Ledesma, Yjka Teraguchi, Dan Boneh, Jonh C. Mitchell, "Client-side defense against web-based identity theft", Computer Science Department, Stanford University, Stanford CA, Feb. 2005.*
"Privacy KeyBoard: Stop Keyloggers Forever", Raytown Corporation LLC, Wilmington, DE, 2005, http://www.privacykeyboard.com/index.html.
"Privacy KeyBoard: privacykeyboard", Raytown Corporation LLC, Wilmington, DE, 2005, http://www.privacykeyboard.com/anti-keyloggers.html.

\* cited by examiner

*Primary Examiner*—Kambiz Zand
*Assistant Examiner*—Peter Poltorak
(74) *Attorney, Agent, or Firm*—Meyertons, Hood, Kivlin, Kowert & Goetzel, P.C.

(57) ABSTRACT

Various embodiments of a system and method for blocking malicious program behaviors, such as keystroke logging behavior or screen capture behavior, are disclosed. Security software may execute on a computer system, where the security software is operable to monitor the computer system to detect malicious program behavior. In response to detecting a first condition indicating that monitoring of the computer system to detect malicious program behavior should be initiated, the security software automatically initiates monitoring of the computer system to detect malicious program behavior. After initiating the monitoring for malicious program behavior, the security software may detect malicious program behavior of a second program executing on the computer system and block the malicious program behavior of the second program.

15 Claims, 6 Drawing Sheets

METHOD, SYSTEM, AND COMPUTER PROGRAM PRODUCT FOR BLOCKING MALICIOUS PROGRAM BEHAVIORS

PRIORITY CLAIM

This application claims priority to U.S. provisional application No. 60/705,892, titled, "Method, System, and Computer Program Product for Blocking a Malicious Activity Within a Computer Network", filed on Aug. 5, 2005, whose inventors were David Glen Lemley III, Bret Michael Needle, and Mark Eric Obrecht.

BACKGROUND OF THE INVENTION

1. Field of the Invention

This invention relates to computer software. More particularly, the invention relates to a method and system for blocking malicious program behaviors, such as keystroke logging or screen capture.

2. Description of the Related Art

Computer users face a wide variety of security threats. Many kinds of security threats involve the surreptitious collection of information by malicious code executing on a user's computer system. For example, a malicious program may execute on the computer system to collect sensitive information such as personal information (e.g., the user's name, address, phone number, social security number, etc.) or financial information (e.g., the user's credit card details, bank account information, etc.). As another example, a malicious program may also collect online account information (e.g., a username, password, etc.) that can be used to access the user's online financial accounts or other online accounts. The malicious program often sends the information it collects to a remote computer system via a network, such as the Internet. The information may then be used for malicious or unauthorized purposes, such as online theft or identity fraud.

Malicious programs may exhibit several types of malicious program behaviors that enable the surreptitious collection of information such as described above. As one example, a malicious program may perform keystroke logging. Keystroke logging refers to logging information indicating the characters that a user enters via an input device, e.g., logging information indicating the keys the user presses on a keyboard. For example, a malicious program may monitor the user's keystrokes and store information indicating the user's keystrokes. Thus, when the user enters sensitive information via the keyboard, the sensitive information may be stored. As described above, the sensitive information may subsequently be used for malicious purposes.

As another example of malicious program behavior, a malicious program may perform screen capturing. Screen capturing refers to storing images that are displayed on the computer system's display. When a user interacts with an application, the application typically displays a graphical user interface on the display. The graphical user interface for some types of applications may display sensitive information. For example, if the user interacts with a financial application or conducts an online financial transaction, the graphical user interface may display sensitive financial information. A malicious program may perform screen capture behavior to store an image of the graphical user interface which displays the financial information or other sensitive information. As described above, the sensitive information may subsequently be used for malicious purposes.

A malicious program that exhibits malicious program behaviors such as described above may be implemented in various ways, e.g., as an independent program, a plug-in software component, a library, a thread, a routine or subroutine, an operating system component, etc. One example of a malicious program is a keystroke logger program, e.g., a program that executes to perform keystroke logging. Another example of a malicious program is a screen capture program, e.g., a program that executes to perform screen capturing. Other examples of malicious programs that may perform keystroke logging and/or screen capture include spyware, viruses, worms, trojans, etc.

Many types of programs that perform keystroke logging and/or screen capture have no legitimate purpose. Some programs that perform keystroke logging and/or screen capture may have legitimate purposes. For example, some types of monitoring software are designed to enable a person to obtain a record of operations that children, a spouse, friends, coworkers and other users perform on a computer system. The monitoring software is often (but not always) purchased from a software vendor and purposefully installed by a user of the computer system to achieve an extra layer of surveillance over the computer system. As another example, advertising supported software, e.g., "adware" or "spyware" may have legitimate purposes.

However, since the information may that is surreptitiously collected by these types of "legitimate" programs may still be used for malicious purposes and since the programs may be installed without the knowledge of a user of the computer system, the keystroke logging and/or screen capture operations that they perform may still be viewed as malicious or potentially malicious behavior.

SUMMARY

Various embodiments of a system and method for blocking malicious program behaviors are described herein. According to one embodiment of the method, security software may execute on a computer system, where the security software is operable to monitor the computer system to detect malicious program behavior. For example, in one embodiment, detecting malicious program behavior may comprise detecting keystroke logging behavior. In another embodiment, detecting malicious program behavior may comprise detecting screen capture behavior.

The method may further comprise the security software detecting a condition indicating that monitoring of the computer system to detect malicious program behavior (e.g., keystroke logging behavior or screen capture behavior) should be initiated. The security software automatically initiates monitoring of the computer system to detect malicious program behavior in response to detecting the condition. The method may further comprise the security software detecting malicious program behavior of a second program executing on the computer system and blocking the malicious program behavior of the second program.

BRIEF DESCRIPTION OF THE DRAWINGS

A better understanding of the invention can be obtained when the following detailed description is considered in conjunction with the following drawings, in which.

Figure 1:
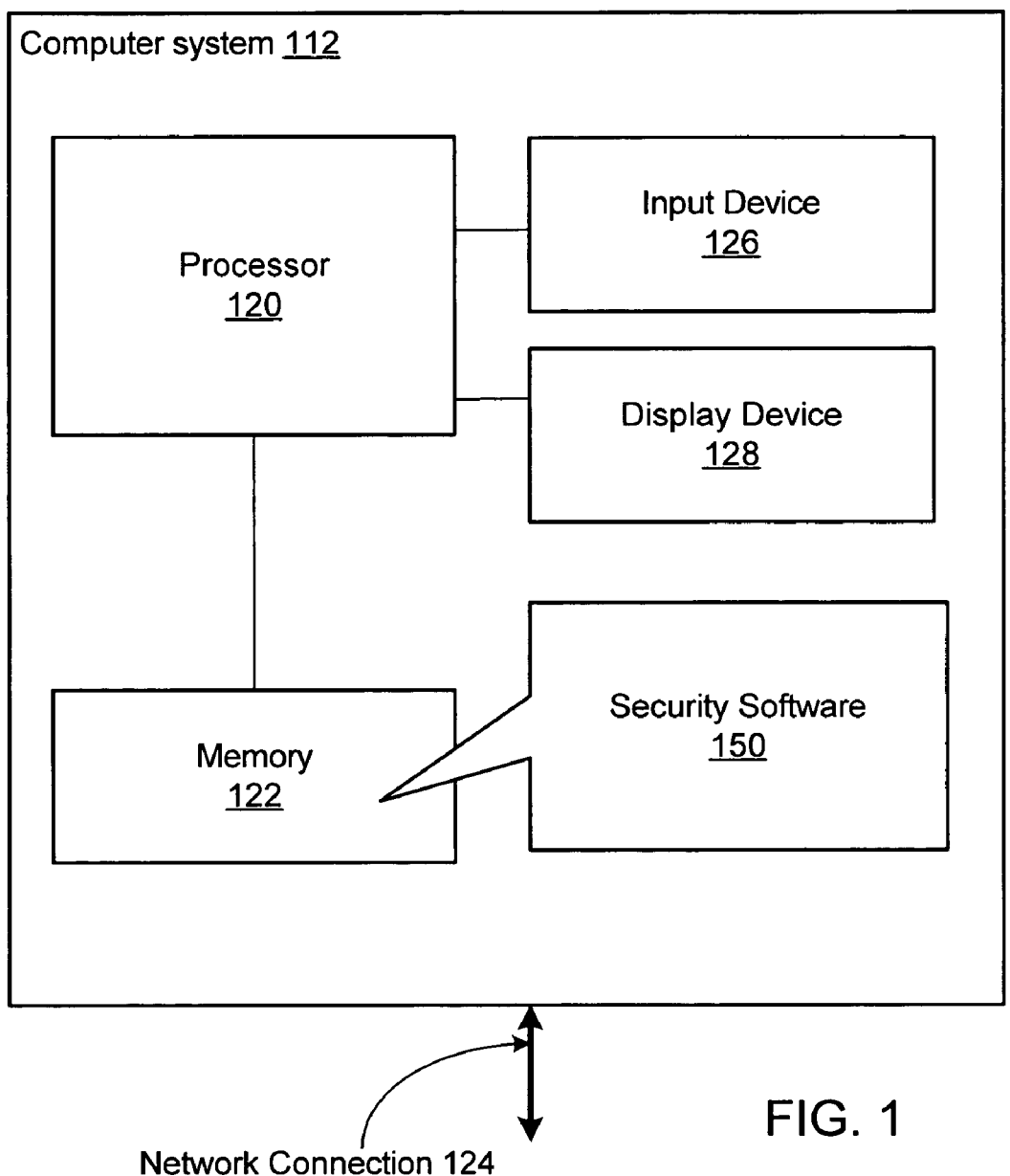
FIG. 1 illustrates an exemplary embodiment of a computer system operable to perform a method for blocking malicious program behaviors.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for blocking malicious (or potentially malicious) program behaviors, such as keystroke logging or screen capture, are described herein.

FIG. 1 illustrates an exemplary embodiment of a computer system 112 which may implement the method. The computer system 112 includes a processor 120 coupled to a memory 122. The memory 122 may be configured to store program instructions and/or data. In particular, the memory 122 may store security software 150. As described in detail below, the security software 150 may execute to detect and block malicious program behaviors, such as keystroke logging or screen capture.

In one embodiment, the memory 122 may include one or more forms of random access memory (RAM) such as dynamic RAM (DRAM) or synchronous DRAM (SDRAM). However, in other embodiments, the memory 122 may include any other type of memory instead or in addition.

The processor 120 may be configured to execute program instructions and to operate on data stored within the memory 122. In particular, the processor 120 may execute the security software 150. It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the computer system 112 may include multiple processors 120.

The computer system 112 also includes one or more input devices 126 for receiving user input from a user of the computer system 112. The input device(s) 126 may include any of various types of input devices. In particular, the input device(s) 126 may include one or more input devices operable to receive alphanumeric character input, text input, or speech input from the user. Examples of such input devices include keyboards, keypads, and microphones. As described below, in some embodiments the security software 150 may execute to detect and block program behavior that attempts to log the alphanumeric character input, text input, or speech input received by the input device(s).

The computer system 112 also includes one or more output devices 128 for displaying output to the user. The output device(s) 128 may include any of various types of output devices. In particular, the output device(s) 128 may include one or more output devices operable to display graphical images, e.g., bitmaps. Examples of such output devices include LCD screens or monitors, CRT monitors, etc. As described below, in some embodiments the security software 150 may execute to detect and block program behavior that attempts to capture images displayed on the output device(s).

The computer system 112 may also include a network connection 124 through which the computer system 112 couples to a network. The network connection 124 may include any type of hardware for coupling the computer system 112 to the network, e.g., to enable communication over the network in a wired or wireless manner. As described below, in some embodiments the security software 150 may execute to protect a user of the computer system from malicious program behaviors such as keystroke logging and/or screen capture while the user is performing an online transaction with a remote computer system on the network.

Figure 2:
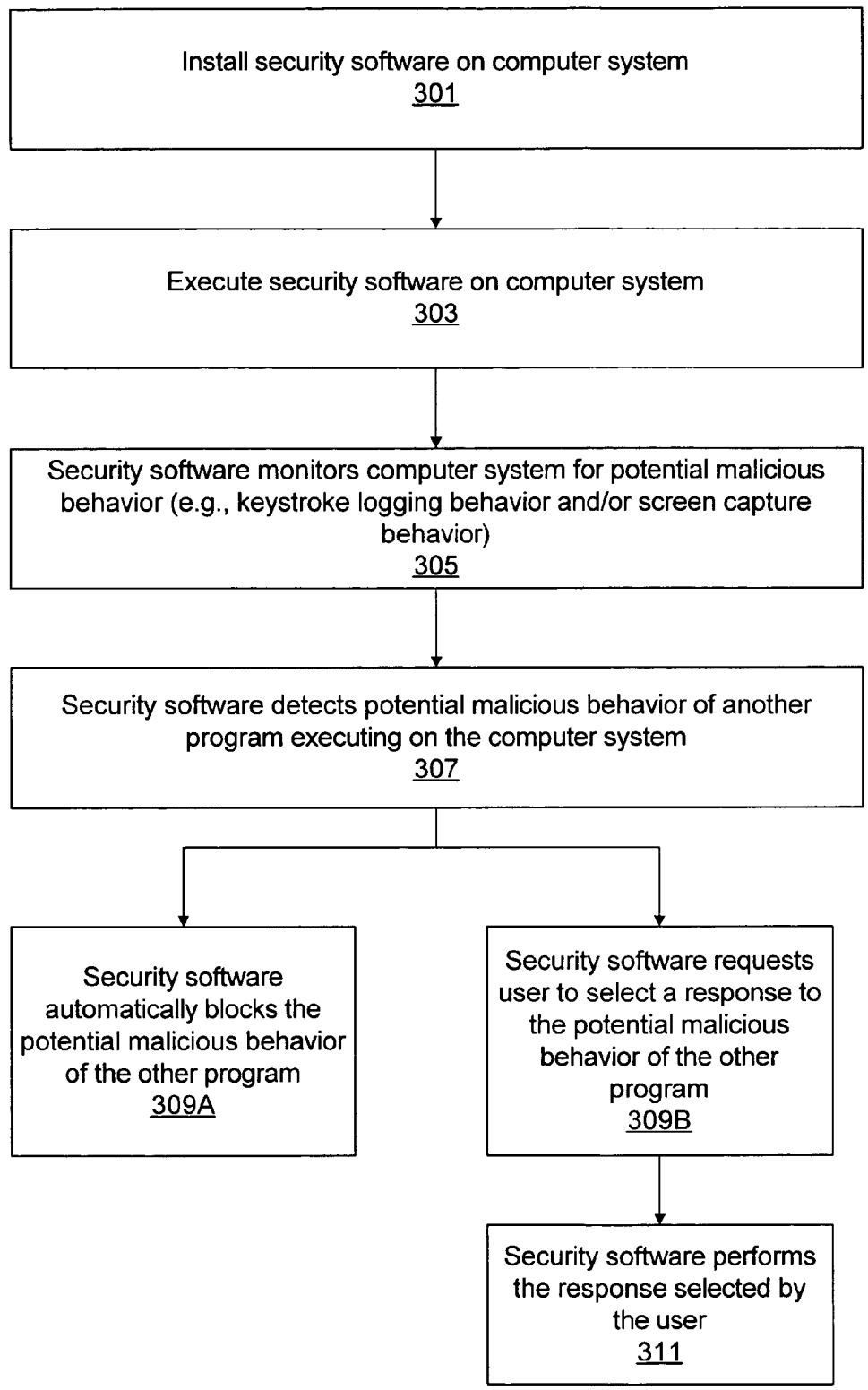
FIG. 2 is a flowchart diagram illustrating an exemplary embodiment of the method for blocking malicious program behaviors.

FIG. 2 is a flowchart diagram illustrating one exemplary embodiment of the method for blocking malicious (or potentially malicious) program behaviors.

In 301, the security software 150 may be installed on the computer system 112. Installing the security software 150 includes storing the security software 150 (e.g., storing program code for the security software 150) on the computer system 112 to enable the computer system 112 to execute the security software 150. For example, the security software 150 may be stored on a hard disk or other persistent storage device of the computer system 112.

In various embodiments, the security software 150 may be installed in various ways. For example, in one embodiment the security software 150 may be installed as a standalone application. In another embodiment the security software 150 may be installed as a part of a security suite. In another embodiment the security software 150 may be installed as a plug-in or add-on component to another application on the computer system 112.

In 303, the security software 150 may be executed on the computer system 112.

As indicated in 305, the security software 150 may execute to monitor the computer system 112 for malicious (or potentially malicious) program behavior. In some embodiments, monitoring the computer system 112 for malicious program behavior may include monitoring the computer system 112 to determine whether user input received from the user input device(s) 126 is being logged, e.g., to determine whether the user input is being stored on the computer system 112 and/or sent to a remote computer system via a network. For example, the security software 150 may monitor the computer system 112 for keystroke logging behavior, e.g., to determine whether alphanumeric characters or text information the user enters via a keyboard or keypad are being logged. As another example, the security software 150 may monitor the computer system 112 to determine whether speech input the user enters via a microphone is being logged.

As one example, a malicious program may log keystrokes in order to create a record of alphanumeric characters input by the user. Such a record may surreptitiously be stored on the computer system 112, e.g., as one or more files, and/or may surreptitiously be sent to a remote computer system via a network. The record may potentially be obtained by a hacker or person with malicious intent in various ways, such as, for example: (a) physical access to the computer system 112; (b) e-mailing or transferring a file with the captured record to a remote e-mail account or computer system of the hacker; (c) transferring the keystrokes to a remote computer system as they occur; (d) access to the computer system 112 via a trojan or backdoor program. As described above, the record of alphanumeric information may include sensitive information that can be used for malicious purposes.

In 305, monitoring the computer system 112 for keystroke logging behavior may comprise performing any of various types of techniques to detect whether a program executing on the computer system 112 is performing keystroke logging. For example, keystroke logging behavior may be detected by monitoring the request and use of various operating system services that can be utilized to perform keystroke logging. The security software 150 may perform this monitoring, for example, via a device driver. Such a monitoring technique may be relatively manageable and transparent, especially in comparison to certain other techniques that monitor user-level application program interfaces ("APIs").

On the Windows platform, a malicious program typically performs keystroke logging by using one of three Win32 APIs to intercept keystrokes. Accordingly, with a device driver, the security software 150 may monitor a program's use of such APIs by monitoring the program's: (a) invocation frequency of the APIs; and (b) number of different keys polled. If these behavioral characteristics exceed certain thresholds then the security software 150 may determine that the program is performing keystroke logging. In various embodiments any of various algorithms, heuristics, or threshold values may be employed to decide whether the program's behavior constitutes keystroke logging.

A malicious program may also use one of several Win32 APIs to register a callback routine, which is invoked for execution upon each keystroke. Accordingly, with a device driver, the security software 150 may monitor such a callback routine for suspicious activity, such as writing the keystroke to a file or transferring the keystroke to another program. If such suspicious behavior is detected then the security software 150 may determine that the program is performing keystroke logging. In various embodiments any of various algorithms, heuristics, or threshold values may be employed to decide whether the program's behavior is sufficiently suspicious to constitute keystroke logging.

Referring again to 305, monitoring the computer system 112 for malicious program behavior may also or may alternatively include monitoring the computer system 112 for screen capture behavior, e.g., monitoring the computer system 112 to determine whether images displayed on the display device(s) 128 are being logged or stored.

As one example, a malicious program may capture screen images in order to create a record of graphical information displayed on the display device(s) 128. The captured screen images may surreptitiously be stored on the computer system 112, e.g., as one or more image files, and/or may surreptitiously be sent to a remote computer system via a network. The screen images may potentially be obtained by a hacker or person with malicious intent in various ways, such as, for example: (a) physical access to the computer system 112; (b) e-mailing or transferring a file with one or more captured screen images to a remote e-mail account or computer system of the hacker; (c) access to the computer system 112 via a trojan or backdoor program. As described above, the captured screen images may include sensitive information that can be used for malicious purposes.

In 305, monitoring the computer system 112 for screen capture behavior may comprise performing any of various types of techniques to detect whether a program executing on the computer system 112 is performing screen capture. For example, screen capture behavior may be detected by monitoring the request and use of various operating system services that can be utilized to perform screen capture. The security software 150 may perform this monitoring, for example, via a device driver. Such a monitoring technique may be relatively manageable and transparent, especially in comparison to certain other techniques that monitor user-level application program interfaces ("APIs").

On the Windows platform, a malicious program typically performs screen capture by using one of several Win32 APIs to copy screen bitmaps into compatible destination memory bitmaps. The destination memory bitmaps may be stored on the computer system 112 and/or transferred via a network to one or more remote computer systems. Accordingly, with a device driver, the security software 150 may monitor a program's use of such APIs. In various embodiments any of various algorithms, heuristics, or threshold values may be employed to decide whether the program's use of the screen capture APIs constitutes malicious screen capture behavior. For example, in one embodiment a single screen capture operation may be sufficient for the security software 150 to tag the program's behavior as malicious screen capture behavior, whereas in other embodiments the security software 150 may take other factors into account, such as the frequency at which screen capture operations are performed. In some embodiments the security software 150 may also monitor callbacks associated with the screen capture APIs, similarly as described above, e.g., in order to determine whether the captured screen images are being written to files or transferred to other programs.

Referring again to FIG. 2, in 307 the security software 150 detects potential malicious behavior of another program executing on the computer system. For example, the security software 150 may detect keystroke logging behavior or screen capture behavior, e.g., using techniques such as those described above.

As indicated in 309A, in one embodiment the security software 150 may automatically block the potential malicious behavior of the other program in response to detecting the potential malicious behavior, e.g., may block the potential malicious behavior without first requesting the user to confirm that the behavior should be blocked and/or without notifying the user that the behavior is being blocked. Blocking the potential malicious behavior of the other program may comprise performing behavioral blocking to mitigate the malicious behavior by altering the programmatic results of its run-time characteristics, so that the behavior is ineffective at harming the computer system 112 or its user.

For example, where keystroke logging is detected in 307, the keystroke logging behavior may be automatically blocked. In various embodiments the keystroke logging behavior may be blocked using various techniques. For example, blocking the keystroke logging behavior may comprise blocking the ability of the malicious program to record keystrokes and/or may comprise replacing the real keystrokes being typed with useless information. For example, if the malicious program is using a callback routine to receive keystroke information then the security software 150 may block the callback routine's ability to receive the keystroke information. As another example, the security software 150 may send useless information to the callback routine in place of the real keystrokes being typed.

As another example, where screen capture behavior is detected in 307, the screen capture behavior may be automatically blocked. In various embodiments the screen capture behavior may be blocked using various techniques. For example, blocking the screen capture behavior may comprise blocking the ability of the malicious program to perform screen capture operations and/or may comprise replacing the real screen image that was captured with useless information. For example, if the malicious program is using a callback routine to receive captured screen images then the security software 150 may block the callback routine's ability to receive the screen images. As another example, the security software 150 may send useless information to the callback routine in place of the real screen image. In another embodiment the screen capture behavior may be blocked by overwriting any previously created destination memory bitmaps.

Automatically blocking the potentially malicious behavior detected in 307 may comprise automatically performing the blocking behavior, e.g., without first requesting confirmation from the user that the potentially malicious behavior should be blocked. In another embodiment, the security software 150 may request the user to select a response to the potential malicious behavior of the other program, as indicated in 309B. For example, the security software 150 may display a graphical user interface, where the graphical user interface enables a user to select a response to the detected behavior. In response to the user selecting a desired response, the security software 150 may perform the response selected by the user, as indicated in 311.

Thus, in some embodiments the user is able to make a policy decision about whether the security software 150 should block a particular program's behavior. For example, a legitimate monitoring program (e.g., parental monitoring program) may exhibit keystroke logging and/or screen capture behavior similar to programs that perform those behaviors for malicious purposes. When the keystroke logging or screen capture behavior of the legitimate monitoring program is detected, the user may exclude the monitoring program from having its behavior blocked by the security software 150.

In various embodiments the security software 150 may present the user with any of various options for responding to the behavior detected in 307. For example, the user may be given a choice to request the security software 150 to block the behavior one time and continue to report future instances of the behavior detected for the same program. The user may also be given a choice to request the security software 150 to block the behavior and automatically block all future instances of the behavior detected for the same program. The user may also be given a choice to request the security software 150 to block the behavior and attempt to automatically remove or quarantine the program. The user may also be given a choice to request the security software 150 to allow the behavior one time and continue to report future instances of the behavior detected for the same program. The user may also be given a choice to request the security software 150 to allow the behavior and automatically allow all future instances of the behavior detected for the same program.

In some embodiments the security software 150 may also be operable to display a list of programs whose behavior the user has requested to be automatically blocked or automatically allowed. The security software 150 may enable the user to change the default responses for the listed programs as desired.

In some embodiments it may be desirable for the security software 150 to continuously monitor the computer system 112 for malicious program behavior. For example, the security software 150 may begin monitoring the computer system 112 for malicious program behavior upon startup of the computer system 112 and may continuously monitor the computer system 112 until it shuts down.

Figure 3:
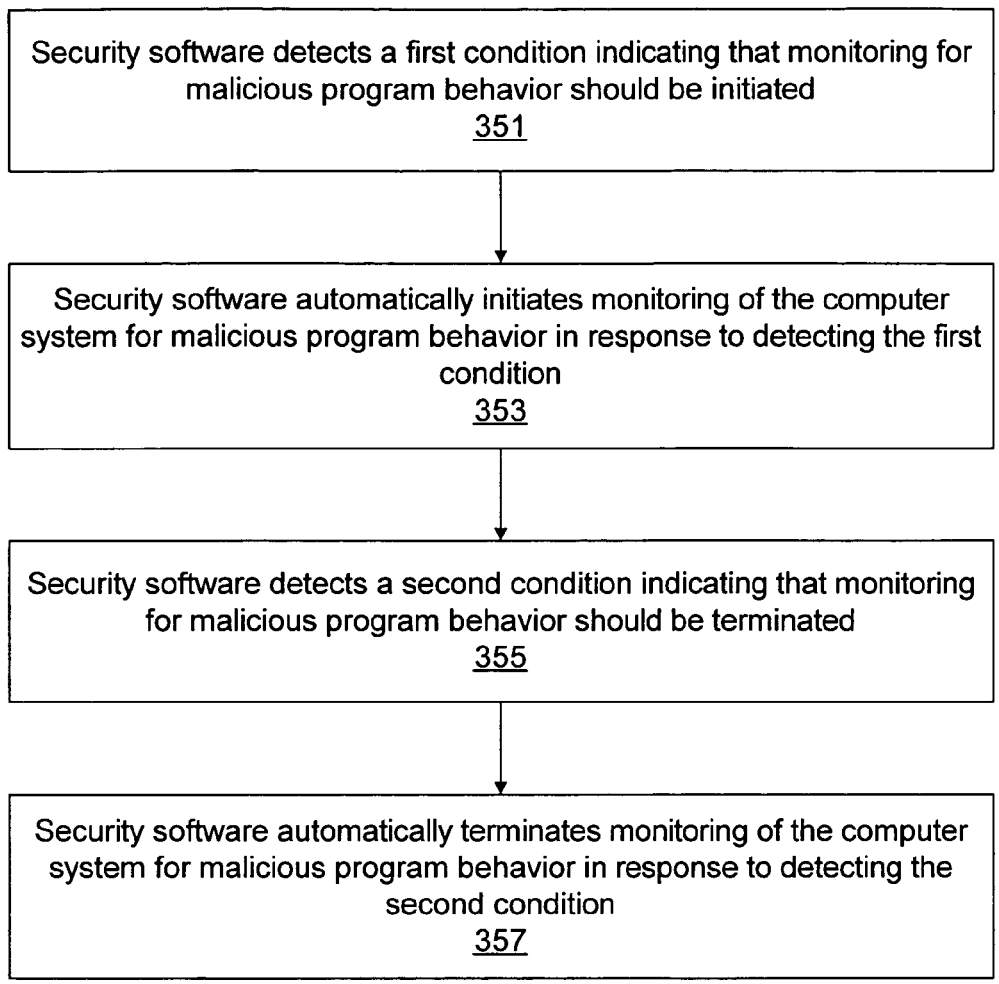
FIG. 3 is a flowchart diagram illustrating an exemplary embodiment in which the method monitors the computer system for malicious program behaviors only during certain conditions.

In other embodiments it may be desirable for the security software 150 to monitor the computer system 112 for malicious program behavior only at certain times or in response to certain conditions. FIG. 3 is a flowchart diagram illustrating an exemplary embodiment in which the security software 150 monitors the computer system 112 for malicious program behavior only in response to certain conditions.

In 351, the security software 150 may detect a first condition indicating that monitoring for malicious program behavior should be initiated.

In 353, the security software 150 may automatically initiate monitoring of the computer system 112 for malicious program behavior in response to detecting the first condition. For example, before the first condition is detected, a portion of the security software 150 (or other software on the computer system 112) may be executing so that it can detect when the first condition occurs, but the security software 150 may not be actively monitoring the computer system 112 for malicious program behavior. Detecting the first condition causes the security software 150 to automatically initiate monitoring of the computer system 112 for malicious program behavior, such as keystroke logging behavior or screen capture behavior.

In some embodiments the security software 150 may also detect a second condition indicating that the monitoring for malicious program behavior should be terminated, as indicated in 355. In response to detecting the second condition, the security software 150 may automatically terminate the monitoring of the computer system 112 for malicious program behavior, as indicated in 357.

In various embodiments, the security software 150 may automatically initiate and/or terminate the monitoring for malicious program behavior in response to any of various kinds of conditions. As one example, detecting the first condition in 351 may comprise detecting execution of a specific application. For example, detecting execution of the application may comprise detecting or being notified that the user has initiated execution of the application, and the security software 150 may automatically begin monitoring the computer system 112 for malicious program behavior in response. As one example, the security software 150 may automatically begin monitoring the computer system 112 for malicious program behavior in response to detecting that a web browser application has been launched. As another example, the security software 150 may begin monitoring the computer system 112 for malicious program behavior in response to detecting that a personal finance application has been launched.

In another embodiment, detecting execution of the application may comprise detecting that the application has performed a particular function. For example, the security software 150 may automatically begin monitoring the computer system 112 for malicious program behavior in response to detecting that an application on the client computer system 112 has performed or has initiated a particular type of network communication. As another example, the security software 150 may automatically begin monitoring the computer system 112 for malicious program behavior in response to detecting that an application on the client computer system 112 has accessed a particular file or type of file.

In other embodiments, detecting the first condition in 351 may comprise detecting a state of the computer system 112 or a state of an application executing on the computer system 112.

In other embodiments, detecting the first condition in 351 may comprise detecting network communication between the computer system 112 and another computer system. Thus, the security software 150 may automatically begin monitoring the computer system 112 for malicious program behaviors, such as keystroke logging behavior and/or screen capture behavior, in response to detecting the network communication. In various embodiments, the security software 150 may begin the monitoring in response to any of various kinds of network communication. For example, the security software 150 may begin the monitoring in response to one or more of: detecting that the computer system 112 is performing network communication according to a particular protocol (e.g., a secure protocol, such as Secure Sockets Layer (SSL) or HTTPS); detecting that the computer system 112 is performing network communication with a particular resource (e.g., a particular web site, web page, network device, or other resource); detecting that the computer system 112 has established a network connection with a particular remote computer system or server application; detecting that the computer system 112 has begun a network authentication process; detecting that the computer system 112 is engaged in an online transaction or session; etc.

As a further example, in one embodiment the security software 150 may begin monitoring the computer system 112 for malicious program behaviors in response to detecting that a browser application has accessed a web page that includes particular types of elements. For example, if the web page includes form elements such as input boxes, check boxes, buttons, etc., then the security software 150 may begin automatically initiate the monitoring for malicious program behaviors. This may protect the user from malicious program behaviors such as keystroke logging or screen capture while the user is communicating with a remote web site to provide sensitive information.

As noted above, in some embodiments the security software 150 may also automatically terminate the monitoring for malicious program behavior in response to detecting a second condition. In various embodiments the security software 150 may be operable to automatically terminate the monitoring for malicious program behavior in response to any of various kinds of conditions. As one example, the monitoring for malicious program behavior may be terminated in response to detecting that execution of a specific application has ended. For example, the security software 150 may operate to only monitor the computer system 112 for malicious program behavior while the application is executing. As one example, the security software 150 may automatically initiate the monitoring when a network client application, e.g., a web browser, has begun executing, and may automatically terminate the monitoring when the network client application has stopped executing.

As another example, the security software 150 may automatically initiate the monitoring when a network client application is engaged in an online transaction with a remote computer system and may automatically terminate the monitoring when the online session has ended. Examples of online transactions are described below.

Thus, in some embodiments the security software 150 may protect the user from keystroke logging behavior, screen capture behavior, or other malicious program behavior during certain conditions such as described above, but the security software 150 may not monitor the computer system 112 for malicious program behavior at other times.

Figure 4:
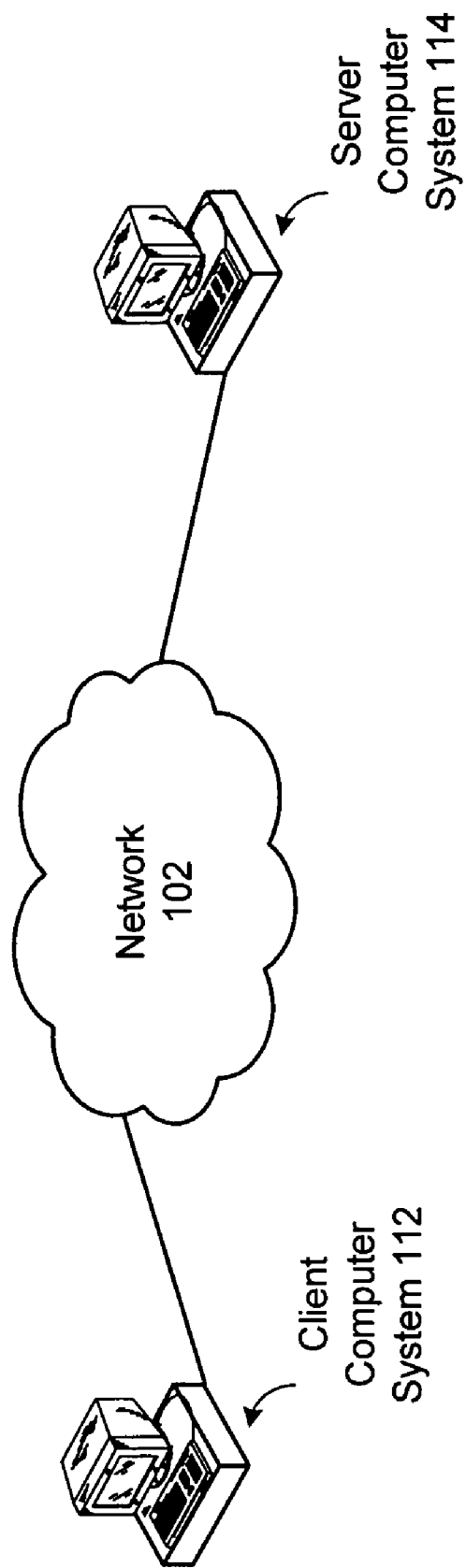
FIG. 4 illustrates an exemplary system in which the computer system communicates as a client computer system with a server computer system via a network.

As discussed above, in some embodiments the security software 150 may automatically initiate the monitoring for malicious program behavior in response to the user initiating use of a networked application or in response to the user initiating an online transaction. For example, FIG. 4 illustrates an exemplary system in which the computer system 112 communicates as a client computer system with a server computer system 114 to which the computer system 112 is coupled via a network 102.

In various embodiments, the network 102 may include any type of network or combination of networks. For example, the network 102 may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, the client computer system 112 and the server computer system 114 may each be coupled to the network 102 using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

Figure 5:
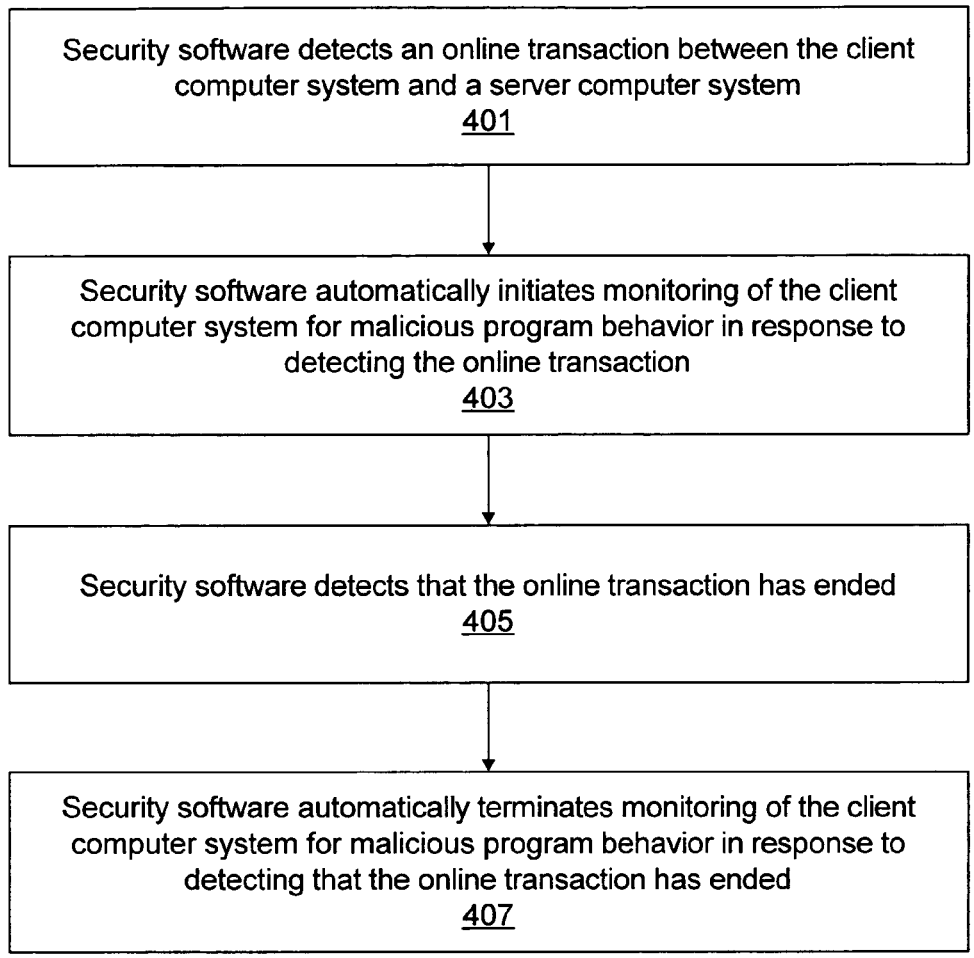
FIG. 5 is a flowchart diagram illustrating one embodiment of a method for protecting the client computer system from malicious program behavior during an online transaction with the server computer system.

The client computer system 112 may communicate with the server computer system 114 to perform an online transaction. The online transaction may comprise an exchange of information between the computer system 112 and the server computer system 114. FIG. 5 is a flowchart diagram illustrating one embodiment of a method for protecting the client computer system 112 from malicious program behavior during the online transaction.

In 401, the security software 150 detects an online transaction between the client computer system 112 and the server computer system 114.

In 403, the security software 150 automatically initiates monitoring of the client computer system for malicious program behavior in response to detecting the online transaction.

In 405, the security software 150 detects that the online transaction has ended.

In 407, the security software 150 automatically terminates monitoring of the client computer system for malicious program behavior in response to detecting that the online transaction has ended.

In various embodiments the computer systems may be connected via any of various types of networks, may communicate using any of various kinds of network protocols, and may perform any of various types of online transactions. As one example, the online transaction may comprise an online web transaction or web session conducted between a browser application executing on the client computer system 112 and a web server application executing on the server computer system 114. In this embodiment the security software 150 may begin monitoring the client computer system 112 for malicious program behavior in response to detecting that the user has initiated the online web transaction or web session. As another example, the online transaction may comprise a virtual private network (VPN) between client-side VPN software executing on the client computer system 112 and server-side VPN software executing on the server computer system 114. In this embodiment the security software 150 may begin monitoring the client computer system 112 for malicious program behavior in response to detecting that the user has initiated the VPN session.

Figure 6:
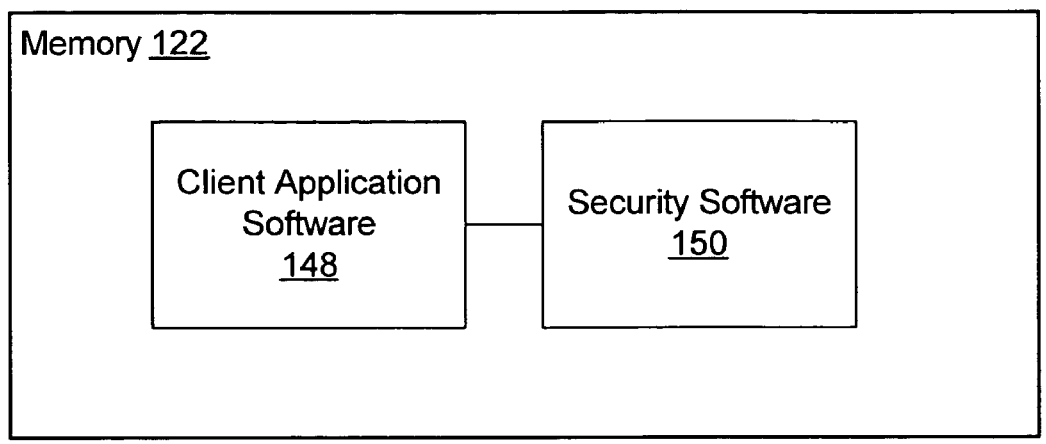
FIG. 6 illustrates an embodiment in which security software communicates with client application software executing on the computer system to protect the client computer system from malicious program behavior during an online transaction with the server computer system.

In some embodiments the security software 150 may communicate with client application software 148 executing on the computer system 112, as shown in FIG. 6. In one embodiment the client application software 148 may communicate with the security software 150 to inform the security software 150 when an online transaction has been initiated. In response, the security software 150 may initiate monitoring the computer system 112 for malicious program behavior, as described above. In some embodiments the security software 150 may be implemented as a plug-in or add-on component that interfaces with the client application software 148 via a plug-in interface provided by the client application software 148. For example, as described below, in some embodiments the client application software may comprise a browser application such as an Internet Explorer or Firefox browser application, and the security software 150 may be implemented as an ActiveX control plug-in for the browser application.

In other embodiments the security software 150 may not automatically initiate monitoring the computer system 112 for malicious program behavior in response to detecting an online transaction, but the security software 150 may still protect the user during online transactions. For example, in one embodiment the security software 150 may continuously monitor the computer system 112 for malicious program behavior, as noted above.

Thus, in various embodiments the security software 150 may be operable to protect users from malicious program behaviors such as keystroke logging or screen capture during any of various types of online transactions. Exemplary embodiments providing protection for various types of online transactions are described in more detail below.

Such behavioral detection and blocking techniques as described above protect users and their computer systems during online transactions or sessions, in which they access the network 102. Such access occurs in various ways, including: (a) the computer system 112 accessing network 102 as the Internet, such as when a user initiates the computer system 112's execution of Internet browser software; (b) the computer system 112 remotely accessing network 102 as a corporate or private network, such as through an Internet Protocol security ("IPsec") virtual private network ("VPN") or an authentication mechanism (e.g., logging in through a secure protocol); and (c) the computer system 112 locally accessing network 102 as a corporate or private network, such as initiating an online session and establishing network privileges with a protocol that give the computer system 112 access to other resources on network 102.

If malicious code has infected the computer system 112, then security is potentially compromised when the computer system 112 accesses network 102. As one example, when the computer system 112 initially obtains access to the network 102 or the server computer 114, the user's authentication information (e.g., identity information, such as usernames and passwords) is at risk of being exposed to the malicious code. Thus, in some embodiments the security software 150 may block the malicious behavior of the malicious code persistently throughout a session during which the user's computer system 112 is permitted to access network 102. This may mitigate the malicious code by interfering with its ability to obtain and provide sensitive information to an online hacker.

Such persistent blocking, throughout the session, of the malicious code's unauthorized behavior may be advantageous because the malicious code is potentially harmful after the user's computer system 112 establishes its access to network 102. For example, if the computer system 112 executes the malicious code after access to network 102 is established, a hacker may be able to remotely perform online theft by viewing the user's sensitive information that is logged using keystroke logging or screen capture techniques.

In one example, such behavioral detection and blocking techniques are integrated into a network session. In one example, if the computer system 112 is accessing network 102 as the Internet, the session: (a) begins when the user initiates the computer system 112's execution of Internet browser software; and (b) ends when the computer system 112 terminates execution of Internet browser software (e.g., in response to a command from the user). In another example, if the computer system 112 is remotely accessing network 102 as a corporate or private network (e.g., as an intranet via one or more portions of the Internet), the session: (a) begins when the computer system 112 initiates such access (e.g., in response to a command from the user); and (b) ends when the user logs off (or the computer system 112 disconnects from) network 102, such as when the computer system 112 terminates execution of (i) Internet browser software during an SSL VPN session or (ii) client-side VPN software. In yet another example, if the computer system 112 is locally accessing network 102 as a corporate or private network, the session: (a) begins when the computer system 112 initiates an online session (e.g., in response to a command from the user) and establishes network privileges with a protocol that give the computer system 112 access to other resources on network 102; and (b) ends when the computer system 112 disconnects from network 102 (e.g., in response to a command from the user), or when the user logs off (or shuts down) the computer system 112.

In some embodiments the security software 150 may be packaged as software on a CD-ROM (or other computer-readable media) that is physically distributed to a user for installation on the computer system 112. In other embodiments the security software may be automatically downloaded to and installed on the computer system 112 without user intervention. For example, a LAN administrator may configure a network so that the security software 150 is automatically installed on the computer system 112 when the computer system 112 connects to the LAN for the first time. As another example, a web page may be configured to cause the security software 150 to be automatically downloaded and installed on the client computer system 112 when the computer system 112 accesses the web page for the first time.

In an illustrative embodiment, the security software 150 may be implemented as ActiveX control software, which is downloadable by the computer system 112 via network 102. As one example of such embodiment, in response to the user's command for the computer system 112 to communicate with a particular web site via network 102, the computer system 112 automatically downloads and installs the ActiveX control software from the particular web site via network 102. Following the installation, the computer system 112 automatically executes the ActiveX control software throughout each online session with the web site, during which the computer system 112 communicates with the particular web site via network 102. In that manner, the particular web site's owner (e.g., financial institution) is able to protect a user (e.g., customer) whose computer system 112 communicates with the particular web site via network 102. Such protection may occur in response to the user's command for the computer system 112 to communicate with the particular web site via network 102, so that such protection occurs: (a) before and while the computer system 112 actually communicates with the particular web site via network 102; (b) before and while the user provides sensitive information (e.g., username, password) to the computer system 112; (c) before and while the computer system 112 outputs the user's sensitive information to the particular web site via network 102.

In another embodiment, before the computer system 112 accesses network 102 as the Internet, the computer system 112's user installs the security software 150 on the computer system 112. After such installation, when the computer system 112 is accessing network 102 as the Internet, the computer system 112 may perform the following sequence of operations:

(a) In response to the user's command for the computer system 112 to initiate execution of Internet browser software, the computer system 112 initiates such execution and likewise initiates execution of the security software 150;

(b) In response to instructions of the security software 150, the computer system 112 monitors the behaviors of programs that are executed by the computer system 112;

(c) In response to such instructions, the computer system 112 inhibits malicious behaviors of such programs;

(d) Optionally, in response to such instructions, the computer system 112 outputs information for display by its display device, so that the user is able to identify programs whose behaviors are being blocked by the computer system 112;

(e) Optionally, in response to such instructions, the computer system 112 outputs a menu for selection by the user, so that by viewing such information and menu on the display device (and by operating the computer system 112's input device to output suitable commands to the computer), the user is able to: (i) exclude a program from having its behavior blocked by the computer system 112; (ii) select a program to have its behavior blocked by the computer system 112 (e.g., if the user previously excluded such program from having its behavior blocked by the computer system 112); (iii) disable such behavioral blocking by the computer system 112; and (iv) enable such behavioral blocking by the computer system 112 (e.g., if the user previously disabled such behavioral blocking);

(f) In response to the user's command for the computer system 112 to terminate execution of Internet browser software, the computer system 112 performs such termination and likewise terminates execution of the security software 150.

In another example, before the computer system 112 remotely or locally accesses network 102 as a corporate or private network, the computer system 112's user installs the security software 150 on the computer system 112, e.g., where the security software 150 may be in the form of ActiveX control software. After such installation, when the computer system 112 is remotely or locally accessing network 102 as a corporate or private network:

(a) The computer system 112 initiates execution of the security software 150 in response to the computer system 112 initiating such access (e.g., in response to a command from the user) via network 102 to a predetermined web page of the corporate or private network, where the user is asked to enter a password for authenticating the user's authority to access the corporate or private network;

(b) In response to instructions of the security software 150, the computer system 112 examines the behaviors of programs that are executed by the computer system 112;

(c) In response to such instructions, the computer system 112 inhibits malicious behaviors of such programs;

(d) Optionally, in response to such instructions, the computer system 112 outputs information for display by its display device, so that the user is able to identify programs whose behaviors are being blocked by the computer system 112;

(e) Optionally, in response to such instructions, the computer system 112 outputs a menu for selection by the user, so that by viewing such information and menu on the display device (and by operating the computer system 112's input device to output suitable commands to the computer), the user is able to: (i) exclude a program from having its behavior blocked by the computer system 112; (ii) select a program to have its behavior blocked by the computer system 112 (e.g., if the user previously excluded such program from having its behavior blocked by the computer system 112); (iii) disable such behavioral blocking by the computer system 112; and (iv) enable such behavioral blocking by the computer system 112 (e.g., if the user previously disabled such behavioral blocking);

(f) If the computer system 112 is remotely accessing the corporate or private network through Internet browser software, then in response to the computer system 112 accessing a different Internet domain (other than the corporate or private network's Internet domain), or in response to the computer system 112 terminating execution of the Internet browser software, the computer system 112 terminates execution of the security software 150; and (g) Alternatively, if the computer system 112 is remotely accessing the corporate or private network through an IPsec VPN, then in response to the computer system 112 terminating execution of the IPsec VPN's client software (or otherwise terminating such access), the computer system 112 likewise terminates execution of the security software 150.

In yet another example, before the computer system 112 accesses network 102 as a LAN, either: (a) the computer system 112's user installs the security software 150 on the computer system 112; or (b) the software is automatically downloaded by (and automatically installed on) the computer system 112, without user intervention, when the computer system 112 connects to the LAN for the first time. After such installation, when the computer system 112 is accessing network 102 as a LAN, the computer system 112 performs the following sequence of operations:

(a) In response to the user logging into the computer system 112, the computer system 112: (i) initiates execution of the security software 150; and (ii) connects to the LAN;

(b) In response to instructions of the security software 150, the computer system 112 examines the behaviors of programs that are executed by the computer system 112;

(c) In response to such instructions, the computer system 112 inhibits malicious behaviors of such programs;

(d) Optionally, in response to such instructions, the computer system 112 outputs information for display by its display device, so that the user is able to identify programs whose behaviors are being blocked by the computer system 112;

(e) Optionally, in response to such instructions, the computer system 112 outputs a menu for selection by the user, so that by viewing such information and menu on the display device (and by operating the computer system 112's input device to output suitable commands to the computer), the user is able to: (i) exclude a program from having its behavior blocked by the computer system 112; (ii) select a program to have its behavior blocked by the computer system 112 (e.g., if the user previously excluded such program from having its behavior blocked by the computer system 112); (iii) disable such behavioral blocking by the computer system 112; and (iv) enable such behavioral blocking by the computer system 112 (e.g., if the user previously disabled such behavioral blocking); and (f) In response to the computer system 112 disconnecting from network 102 (e.g., in response to a command from the user), or in response to the user logging off (or shutting down) the computer system 112, the computer system 112 terminates execution of the security software 150.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication Medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for blocking keystroke logging on a first computer system, the method comprising:
   executing first program on the first computer system, wherein the first program executes to monitor the first computer system to detect keystroke logging behavior;
   the first program automatically initiating monitoring of the first computer system to detect keystroke logging behavior in response to detecting initiation of network communication between the first computer system and a second computer system;
   the first program detecting keystroke logging behavior of a second program executing on the first computer system; and
   the first program blocking the keystroke logging behavior of the second program.

2. The method of claim 1, further comprising:
   the first program detecting a condition indicating that the monitoring of the first computer system to detect keystroke logging behavior should be terminated; and
   the first program automatically terminating the monitoring of the first computer system to detect keystroke logging behavior in response to said detecting the condition.

3. The method of claim 1, further comprising:
   the first program detecting that the network communication between the first computer system and the second computer system has ended; and
   the first program automatically terminating the monitoring of the first computer system to detect keystroke logging behavior in response to said detecting that the network communication has ended.

4. The method of claim 1, wherein said detecting the initiation of the network communication between the first computer system and the second computer system comprises detecting initiation of an online transaction between the first computer system and the second computer system.

5. The method of claim 4, further comprising:
   the first program detecting that the online transaction between the first computer system and the second computer system has ended; and
   the first program automatically terminating the monitoring of the first computer system to detect keystroke logging behavior in response to said detecting that the online transaction has ended.

6. The method of claim 4, wherein said detecting the initiation of the online transaction between the first computer system and the second computer system comprises one or more of:
   detecting initiation of a web-based transaction between the first computer system and the second computer system;
   detecting initiation of a browser session between the first computer system and the second computer system; and/or
   detecting that the first computer system has begun a transaction with a website hosted by the second computer system.

7. The method of claim 4,
   wherein said detecting the initiation of the online transaction between the first computer system and the second computer system comprises detecting initiation of a virtual private network (VPN) session between the first computer system and the second computer system.

8. The method of claim 1, wherein said blocking the keystroke logging behavior of the second program comprises automatically blocking the keystroke logging behavior of the second program in response to said detecting the keystroke logging behavior of the second program.

9. The method of claim 1, further comprising:
   the first program displaying a graphical user interface on the first computer system, wherein the graphical user interface enables a user to select a response to said detecting the keystroke logging behavior of the second program; and
   the first program receiving user input selecting a blocking response via the graphical user interface;
   wherein said blocking the keystroke logging behavior of the second program comprises blocking the keystroke logging behavior of the second program in response to the user input selecting the blocking response.

10. A non-transitory computer-accessible storage medium storing first program instructions of a first program, wherein the first program instructions are executable by a first computer system to:
    automatically initiate monitoring of the first computer system to detect keystroke logging behavior in response to detecting initiation of network communication between the first computer system and a second computer system;
    detect keystroke logging behavior of a second program executing on the first computer system; and
    block the keystroke logging behavior of the second program.

11. The non-transitory computer-accessible storage medium of claim 10, wherein the first program instructions are further executable by the first computer system to:
    detect a condition indicating that the monitoring of the first computer system to detect keystroke logging behavior should be terminated; and
    automatically terminate the monitoring of the first computer system to detect keystroke logging behavior in response to detecting the second condition.

12. The non-transitory computer-accessible storage medium of claim 10, wherein the first program instructions are further executable by the first computer system to:
    detect that the network communication between the first computer system and the second computer system has ended; and
    automatically terminate the monitoring of the first computer system to detect keystroke logging behavior in response to said detecting that the network communication has ended.

13. A first computer system comprising:

one or more processors; and memory storing a first program and a second program;

wherein the first program is executable by the one or more processors to:

automatically initiate monitoring of the first computer system to detect keystroke logging behavior in response to detecting initiation of network communication between the first computer system and a second computer system;

detect keystroke logging behavior of the second program; and block the keystroke logging behavior of the second program.

14. The first computer system of claim 13, wherein the first program is further executable by the first computer system to:

detect a condition indicating that the monitoring of the first computer system to detect keystroke logging behavior should be terminated; and automatically terminate the monitoring of the first computer system to detect keystroke logging behavior in response to detecting the condition.

15. The first computer system of claim 13, wherein the first program is further executable by the first computer system to:

detect that the network communication between the first computer system and the second computer system has ended; and automatically terminate the monitoring of the first computer system to detect keystroke logging behavior in response to said detecting that the network communication has ended.

\* \* \* \* \*